US006533659B2

(12) United States Patent
Seymour et al.

(10) Patent No.: US 6,533,659 B2
(45) Date of Patent: Mar. 18, 2003

(54) GAME MACHINES AND METHOD OF UPGRADING GAME MACHINES

(75) Inventors: Todd M. Seymour, Arvada, CO (US); Frank Post, Arvada, CO (US)

(73) Assignee: Millennium Gaming, Inc., Idaho Springs, CO (US)

( * ) Notice: Subject to any disclaimer, the term of this patent is extended or adjusted under 35 U.S.C. 154(b) by 176 days.

(21) Appl. No.: 09/849,212

(22) Filed: May 4, 2001

(65) Prior Publication Data

US 2002/0187826 A1 Dec. 12, 2002

(51) Int. Cl.[7] .......................... A63F 13/00; A63F 9/24; G06F 17/00; G06F 19/00

(52) U.S. Cl. ............................ 463/16; 463/16; 463/46; 273/143 R; 312/7.2

(58) Field of Search ............................ 463/20, 16, 46; 273/143 R, 138.1, 138.2, 148.13; 312/7.2, 222, 215, 221

(56) References Cited

U.S. PATENT DOCUMENTS 4,440,457 A * 4/1984 Fogelman et al. ........... 312/7.2
4,517,558 A * 5/1985 Davids ................... 273/143 R
4,795,155 A * 1/1989 Grande ................... 273/143 R
5,544,728 A * 8/1996 Dabrowski .............. 273/143 R
5,700,195 A * 12/1997 Halic .......................... 463/20
5,813,914 A * 9/1998 McKay ........................ 463/46
5,826,882 A * 10/1998 Ward ...................... 273/143 R
6,135,884 A * 10/2000 Hedrick et al. ............... 463/20
6,164,645 A * 12/2000 Weiss ...................... 273/138.2
6,199,861 B1 * 3/2001 Hume et al. ............ 273/118 R
6,420,972 B1 * 7/2002 Loose .................... 273/143 R
2001/0053712 A1 * 12/2001 Yoseloff et al. ................ 463/1

OTHER PUBLICATIONS

Mame Retro–setted set–up article 2000.*
Fey, *Slot Machines,* Liberty Belle Books 1997.*

* cited by examiner

*Primary Examiner*—Michael O'Neill

(57) ABSTRACT

Generally relates to a method of upgrading an IGT S-Plus slot wagering machine to a video touch screen wagering game machine. The method generally involves removing the existing door, processor board, shelf (including the reels), and candle control board from the machine, mounting a lower door and an upper panel in the space previously occupied by the existing door, the upper door of which includes a video touch screen, and operationally connecting a new processor board with the video touch screen and the other machine components. The modified machine is also disclosed.

9 Claims, 14 Drawing Sheets

GAME MACHINES AND METHOD OF UPGRADING GAME MACHINES

FIELD OF THE INVENTION

This invention relates generally to game machines, and more specifically to a process of upgrading an IGT S-Plus slot machine.

BACKGROUND OF THE INVENTION

Many game machines, such as casino slot machines and casino video machines, often become obsolete, often because the hardware becomes old or outdated, and often because the popularity of the game fades. Many video machines postpone obsolescence by possessing platforms that can be programmed to offer any one of a variety of video games. Other games, such as those having hardware that has become obsolete, are much more difficult to modify.

A slot machine known as the IGT S-Plus has been very popular, and it is currently estimated that 600,000 IGT S-Plus slot machines have been installed in approximately 70% of the casinos in just the United States. These slot machines involve physical, mechanical reels. New technology and competition entered the industry around 1995, and the IGT S-Plus slot machine started becoming obsolete. Apparently, IGT accepted the S-Plus slot machines as trade-ins against the acquisition price of different machines from IGT. However, casinos have been disappointed with the trade-in value as well as the fact that in order to obtain the trade-in credit, they are required to purchase a different IGT machine, rather than a machine from one of IGT's competitors.

The present invention relates to a method of modifying the IGT S-Plus slot machine to a video wagering game machine and relates to the resulting modified machine. It will be appreciated, however, that the present invention has broader application than solely with respect to the IGT S-Plus slot machine.

SUMMARY OF THE INVENTION

The present invention generally relates to a method of upgrading an IGT S-Plus slot wagering machine to a video wagering game machine. The method generally involves removing the existing door, processor board, shelf (including the reels), and candle control board from the machine, mounting a lower door and an upper panel in the space previously occupied by the existing door, the upper panel of which includes a video touch screen, and operationally connecting a new processor board with the video touch screen and the other machine components. The modified machine is also disclosed.

BRIEF DESCRIPTION OF THE DRAWING

The invention will be described with reference to the accompanying drawings wherein.

DESCRIPTION OF A PREFERRED EMBODIMENT

Figure 1B:
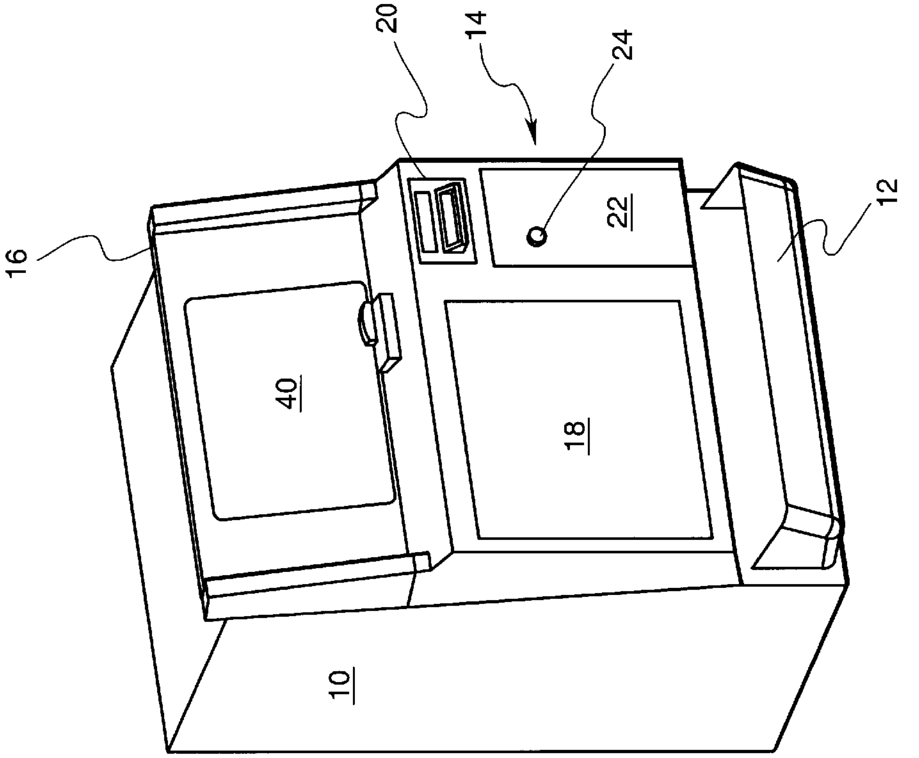
FIGS. 1A and 1B are perspective views taken from two angles of a modified machine according to the prevention invention.

The present invention will be described with reference to the accompanying drawings wherein like reference numerals refer to the same item.

Figure 1A:
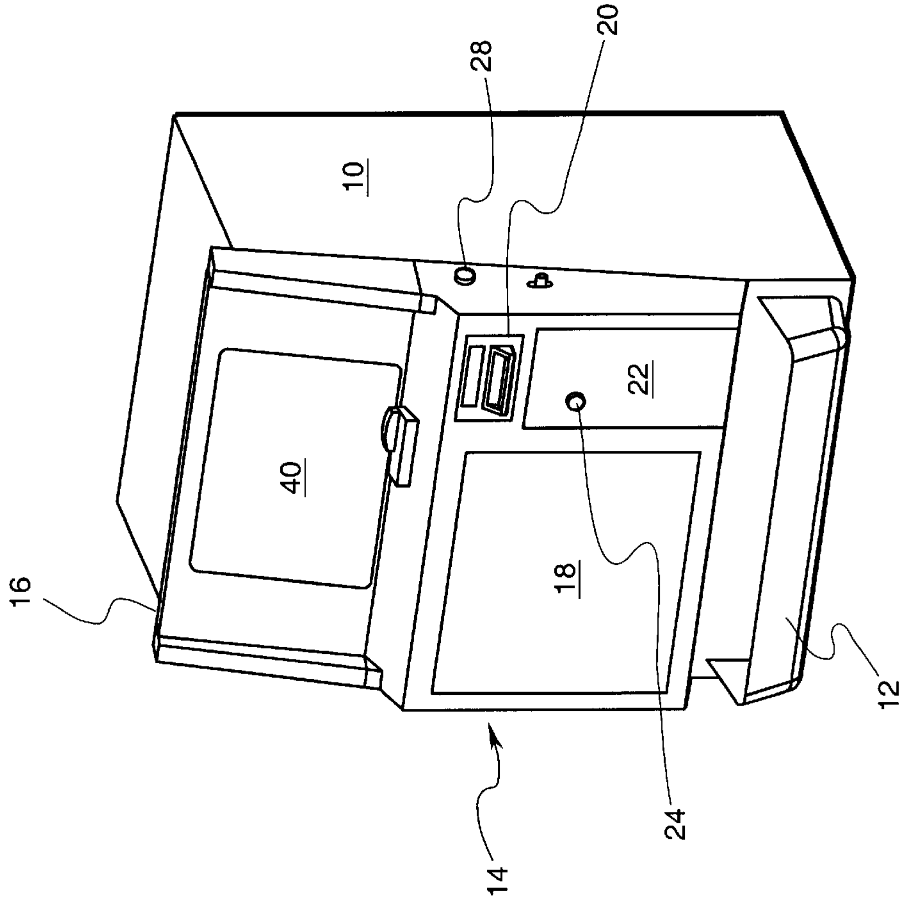
Figure 2B:
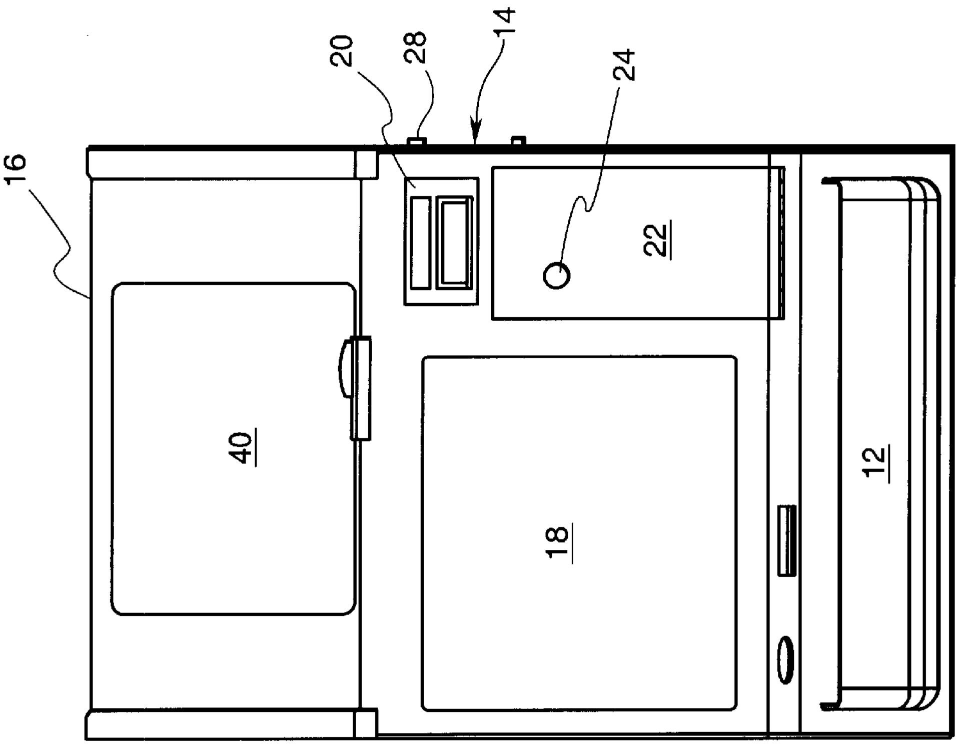
FIGS. 2A and 2B are a side elevation view and a front elevation view, respectively, of the machine shown in FIGS. 1A and 1B.
Figure 2A:
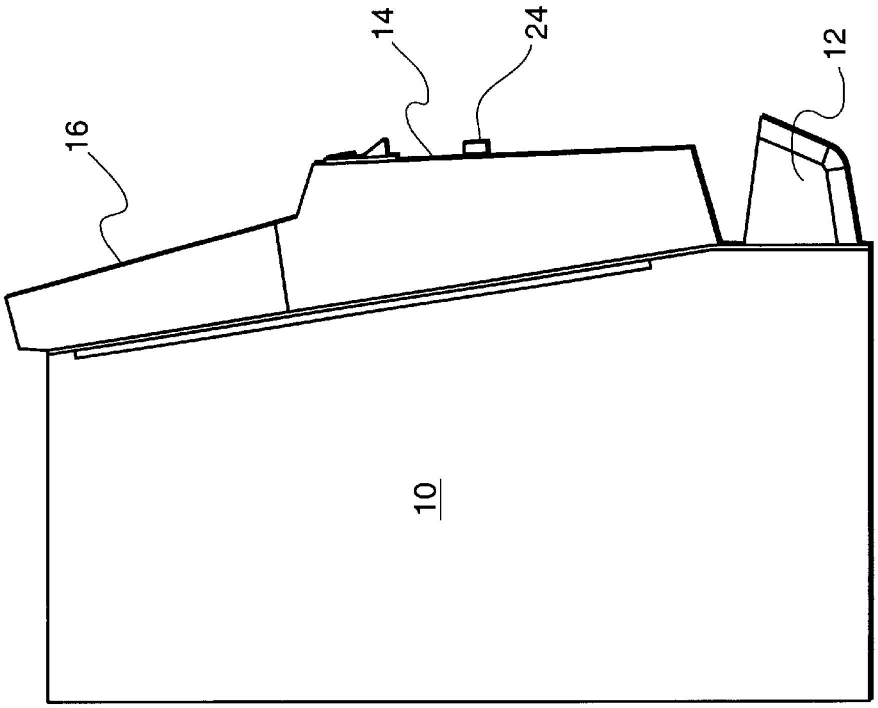
Figure 3:
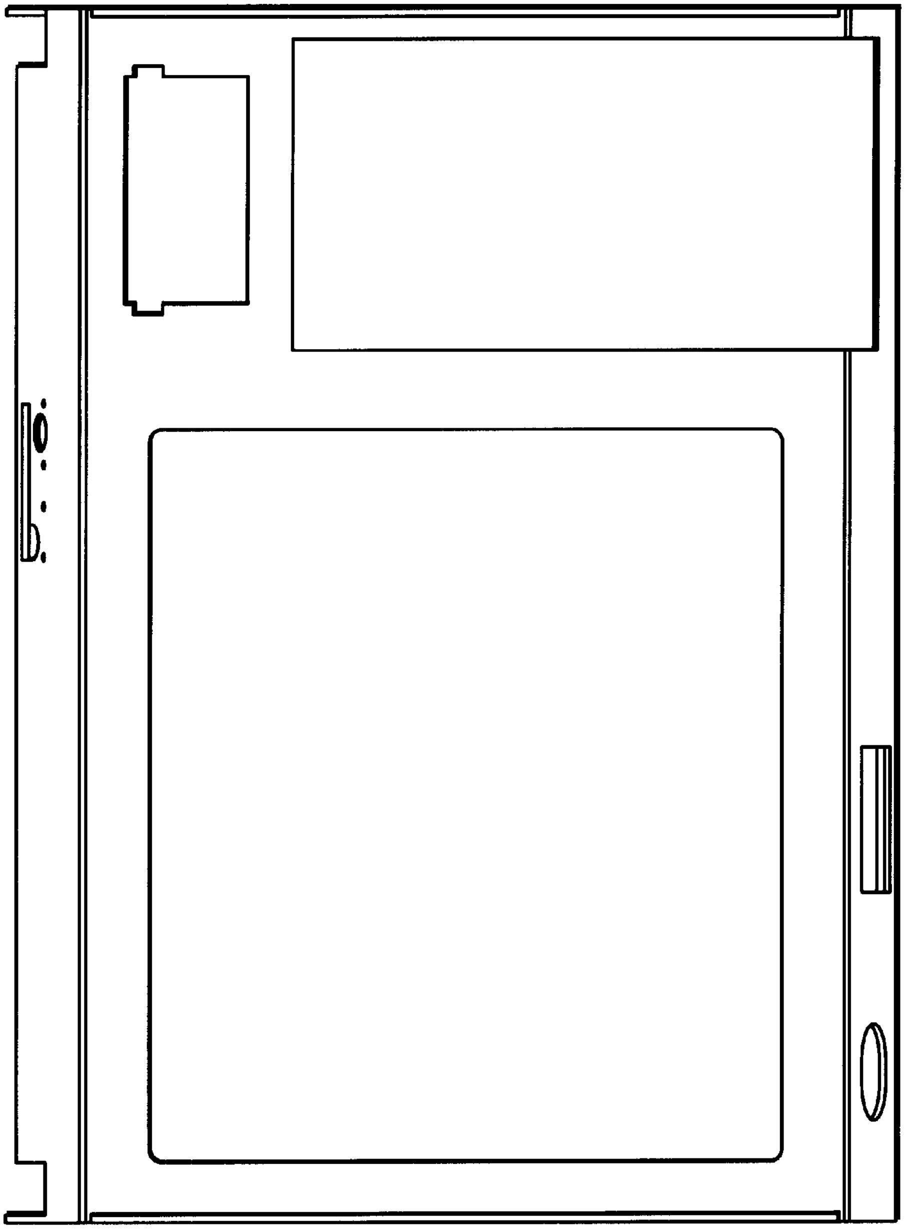
FIG. 3 is a front elevation view of a lower door utilized in the machine shown in FIGS. 1A and 1B.
Figure 4B:
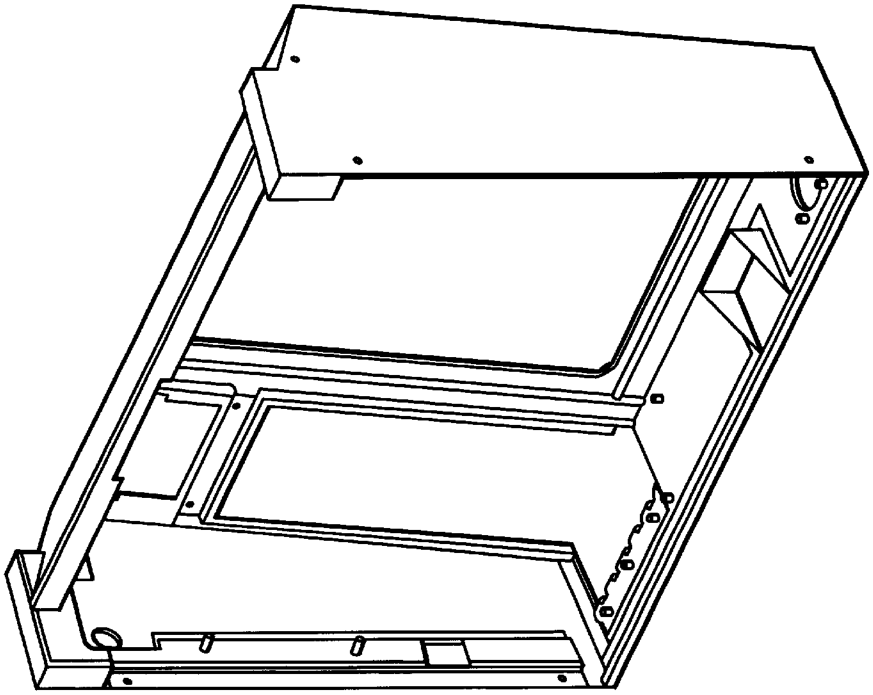
FIGS. 4A and 4B are perspective views taken from two different angles of the lower door as shown in FIG. 3.
Figure 4A:
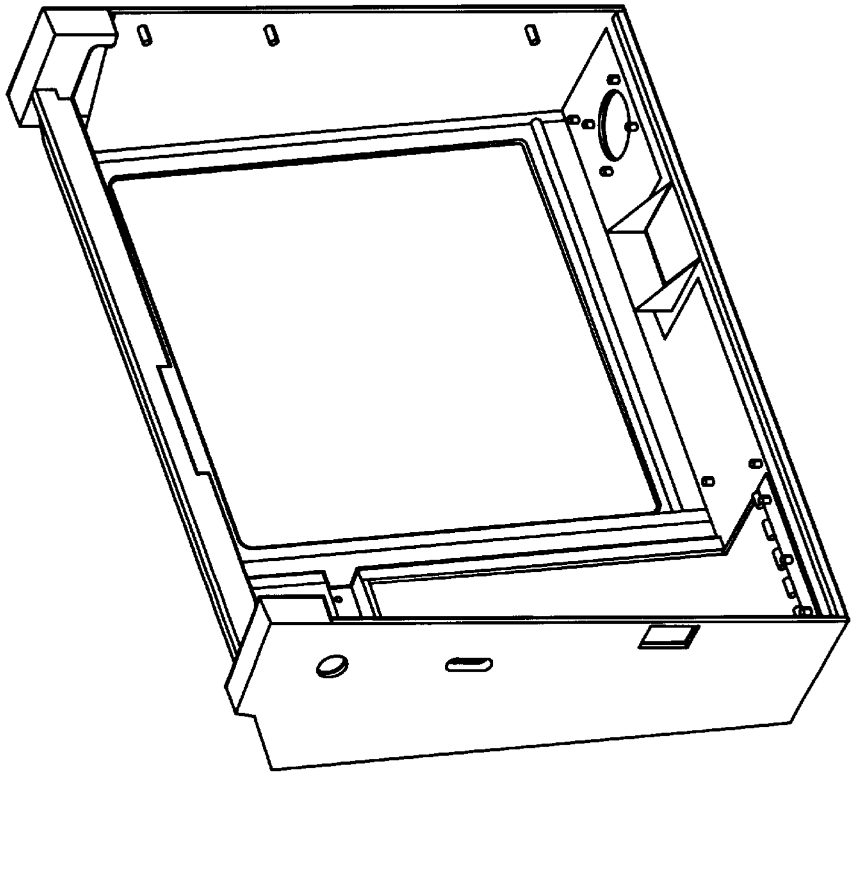
Figure 5C:
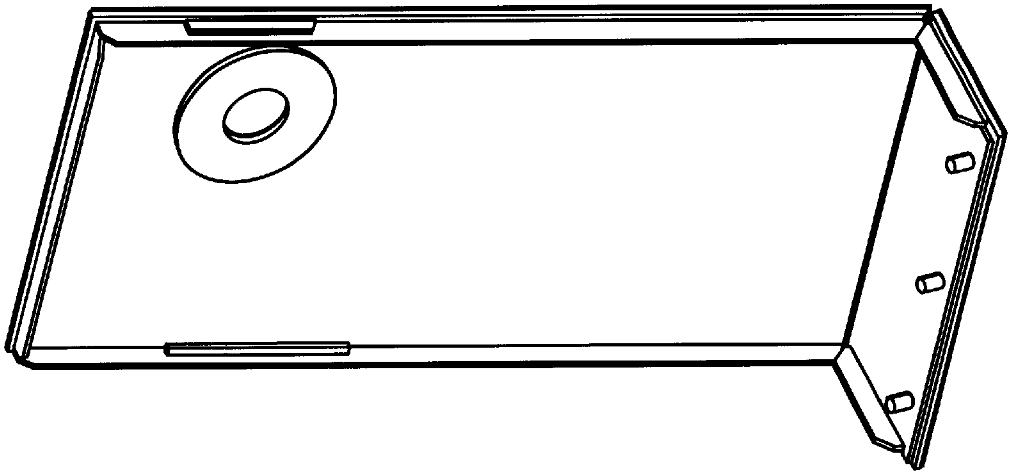
FIGS. 5A, 5B, and 5C are a rear elevation view, a side elevation view, and a perspective view, respectively, of a lock box door utilized with the lower door as shown in FIG. 3.
Figure 5B:
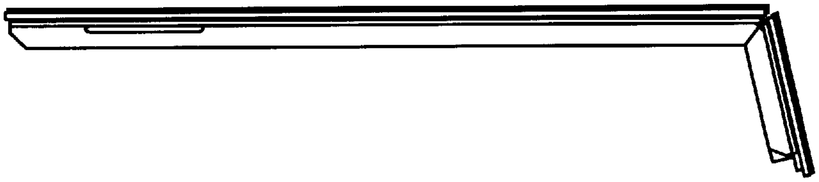
Figure 5A:
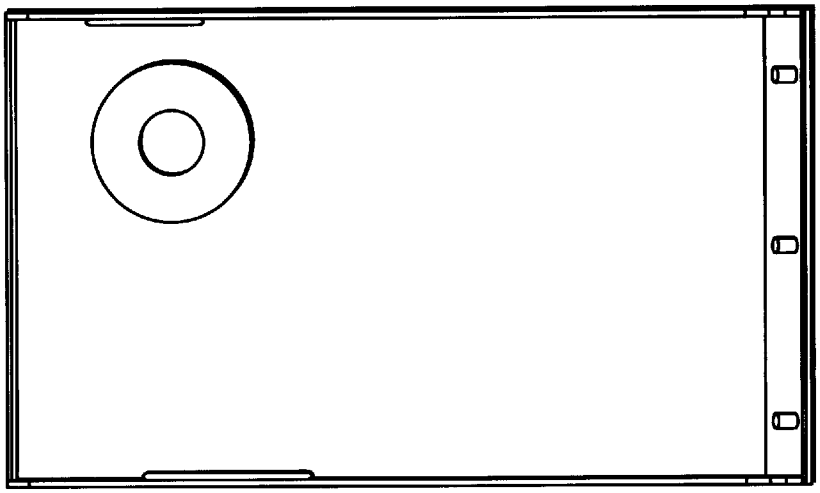
Figure 6B:
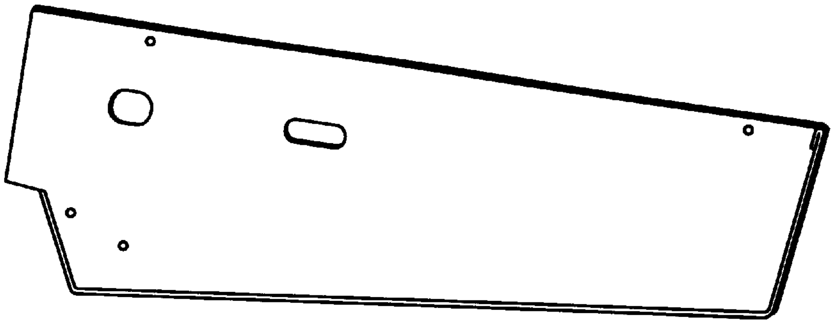
FIGS. 6A and 6B are side elevation views of two side plates used in each lateral side of the door as shown in FIG. 3.
Figure 6A:
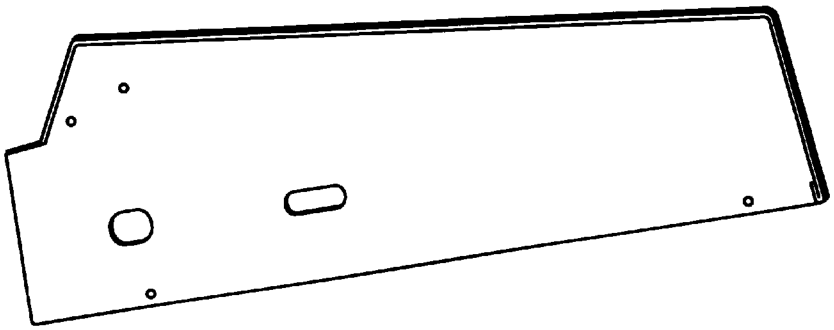
Figure 7:
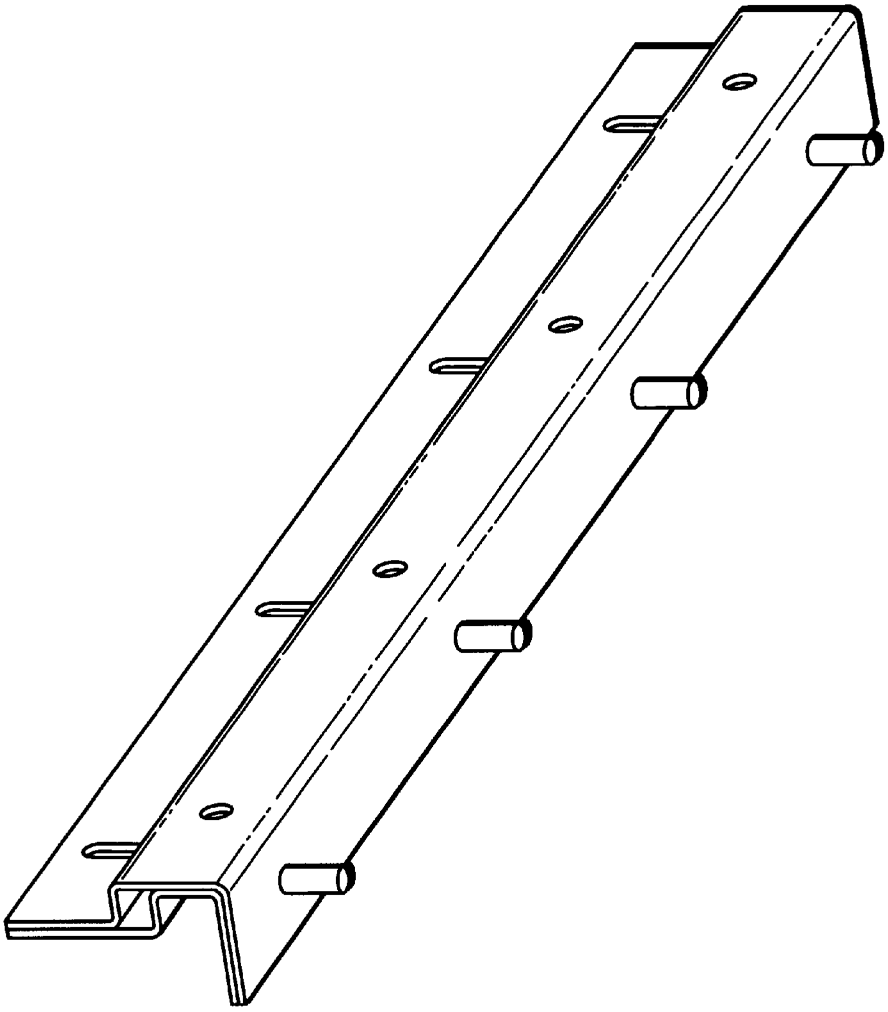
FIG. 7 is a hinge mounting plate utilized with the lower door as shown in FIG. 3.

In general, and in accordance with a preferred embodiment of the present invention, certain parts of an existing IGT S-Plus slot machine are removed, including the door, the processor board, the shelf (with the reels), and the candle control board. The pull handle may be removed, or alternatively, may be used as a game initiation mechanism in connection with the modified machine. As shown in FIGS. 1A and 1B, the pull handle has been removed from its location along the right side of the machine, whereas in FIG. 11, the pull handle is still attached to the machine. A lower door and an upper door or panel are installed in the region of the removed door. The upper panel includes a video display such as a video touch screen. A new processor board is installed and operationally connected with the touch screen as well as the existing components of the machine, such as the lighting system, the change validator, the bill validator, and the hopper.

As shown in FIGS. 1A and 1B, the modified machine generally includes an upstanding box shaped housing 10, with a coin collection trough 12 mounted on the lower front surface of the housing 10. The machine also generally includes a lower door 14 and an upper panel 16. The lower door 14 includes a rectangularly shaped panel or belly glass 18 which contains artwork and graphics pertaining to the game or games to be played on the machine. The lower door 14 also includes a conventional bill validator entrance slot 20 designed to cooperatively interact with a drop box (not shown). The lower door 14 also includes a lock box access door 22 hingedly mounted along its lower length so that the lock box access door 22 may be opened without opening the lower door 14, as best shown in FIGS. 2A, 4A, and 4B, and 5A–C. The lock box access door 22 is provided with a key actuated lock 24.

Figure 11:
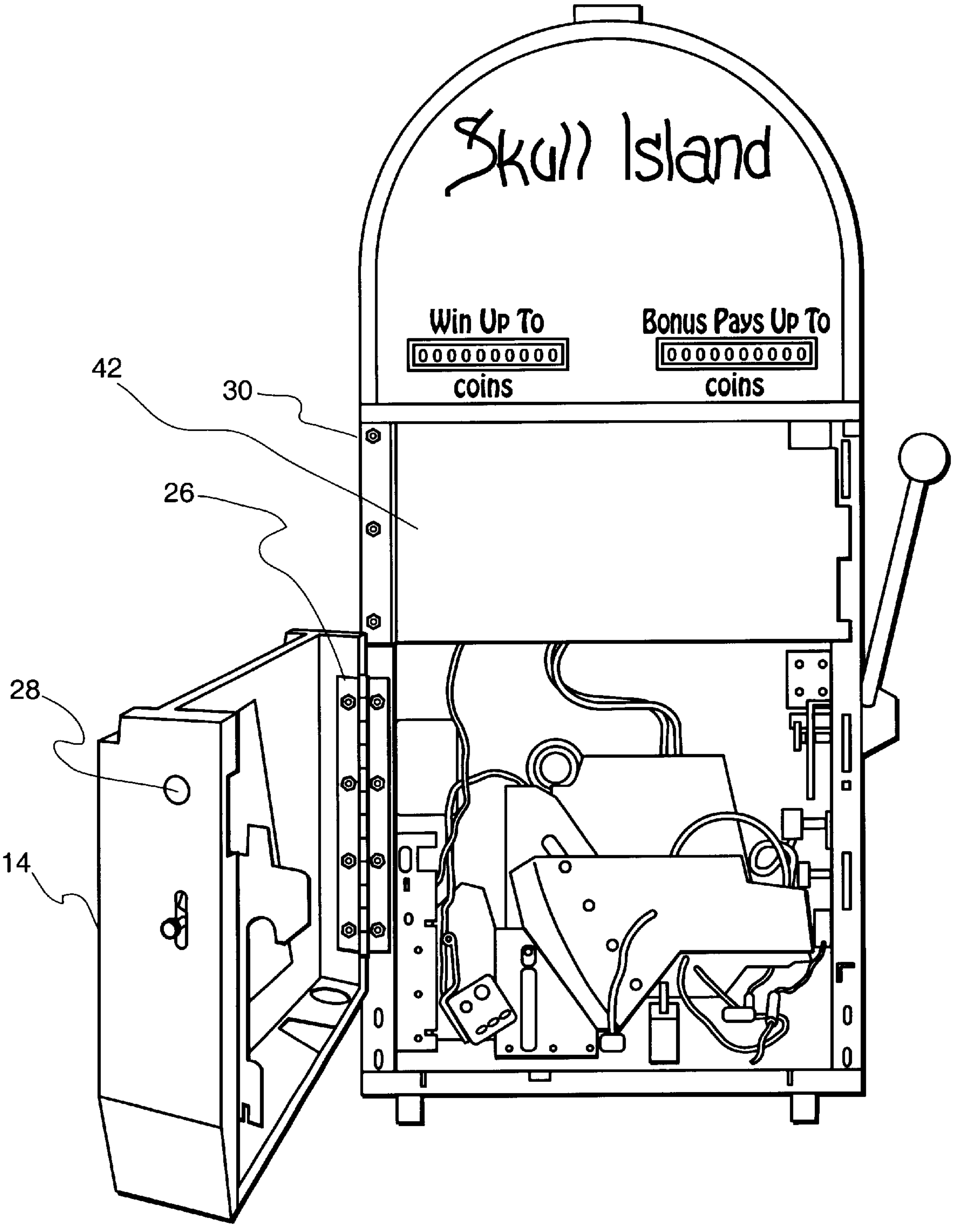
FIG. 11 is a front elevational illustration of the machine shown in FIGS. 1A and 1B with the lower door in an open position and depicting the backing plate upon which the upper panel is adapted to be mounted.
Figure 12:
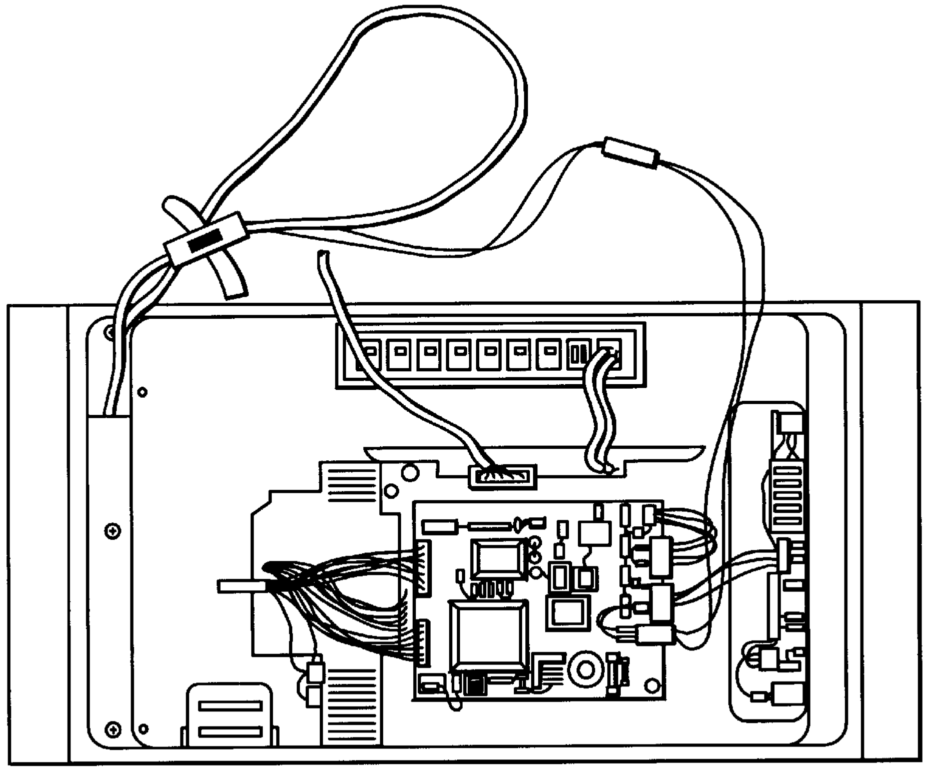
FIG. 12 is a rear perspective view of the upper panel.
Figure 13:
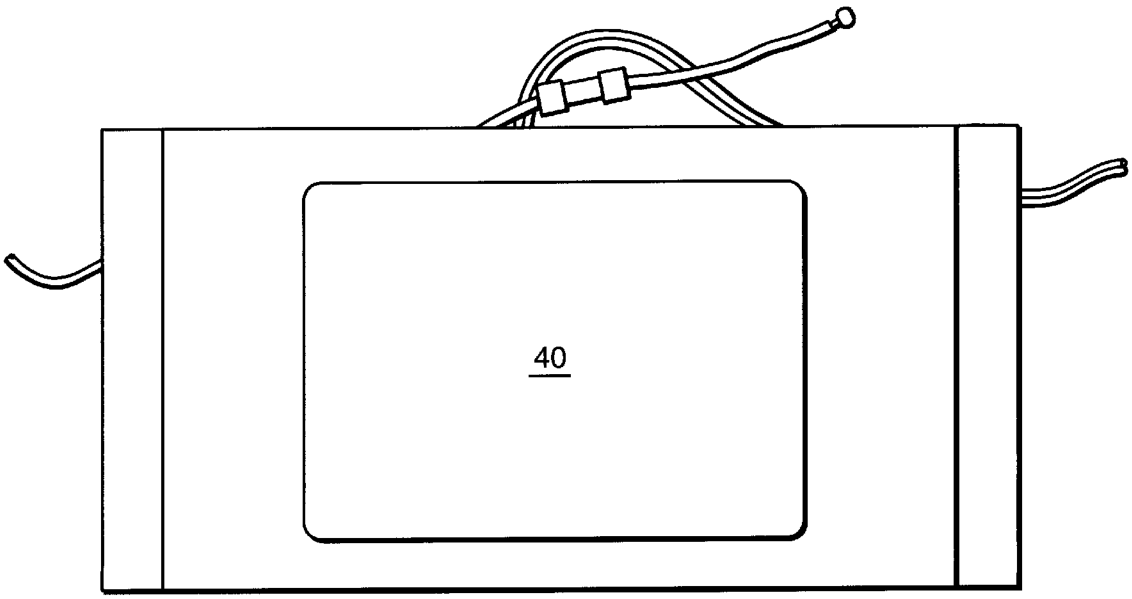
FIG. 13 is a front perspective view of the upper panel shown in FIGS. 1A and 1B.

The lower door 14 may be swung open about a hinge 26, as best shown in FIG. 11, which connects one lateral side of the lower door 14 to a lateral side of the housing 10. The lower door 14 may also be locked in a closed position by means of a key actuated lock 28.

A substantially rectangular backing plate 30 is generally installed in a substantially vertical position slightly within the housing, and positioned generally higher than the lower door 14, as best shown in FIG. 11. The backing plate includes four vertically oriented slots each positioned in a corresponding one of the corners of the backing plate, again as best shown in FIG. 11.

Figure 8B:
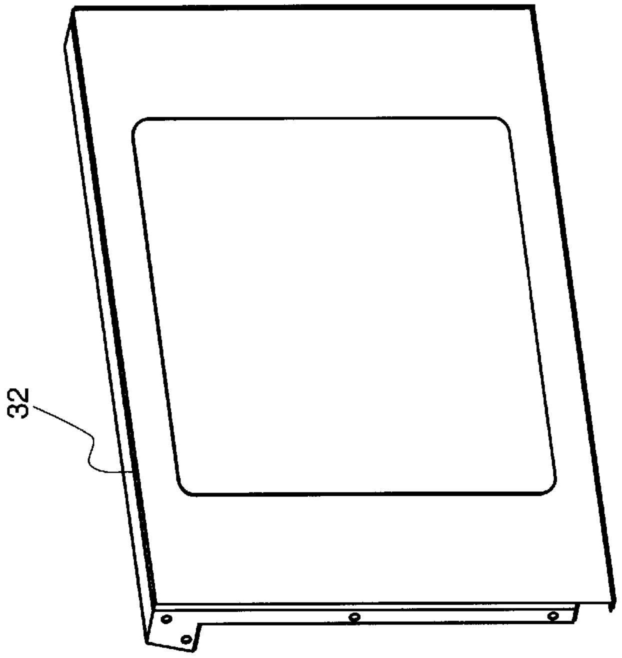
FIGS. 8A and 8B are a front elevation view of a metal blank used for making a monitor panel and a perspective view of the monitor panel, respectively, utilized in an upper panel of the machine shown in FIGS. 1A and 1B.
Figure 8A:
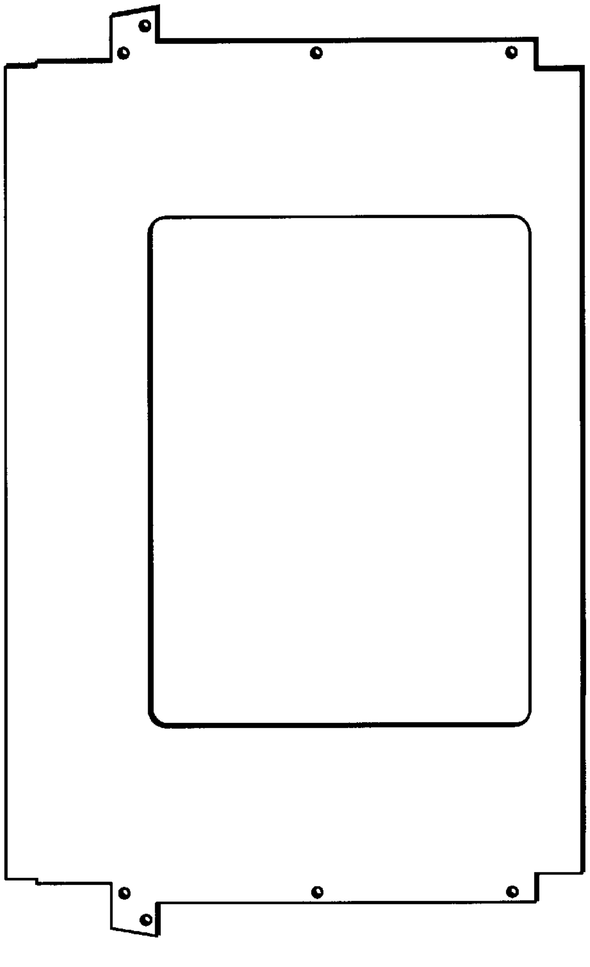
Figure 9B:
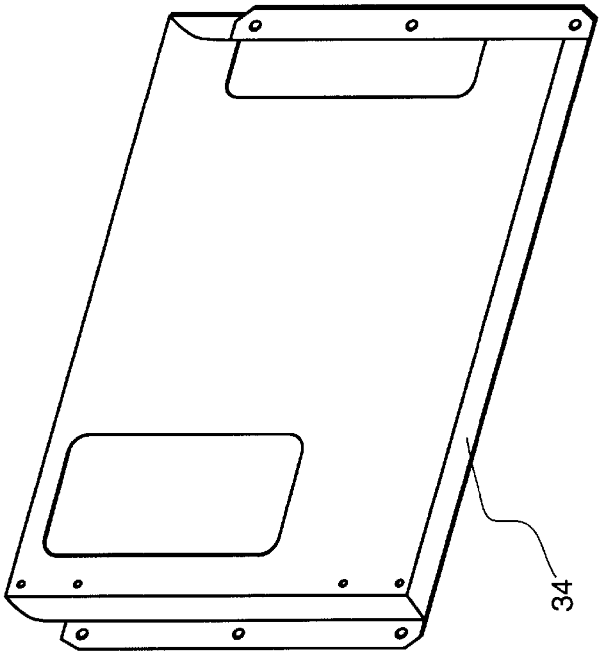
FIGS. 9A and 9B are a front elevation view of a metal blank used to make a monitor bucket and a perspective view of the monitor bucket, respectively, utilized with the upper panel as shown in FIGS. 1A and 1B.
Figure 9A:
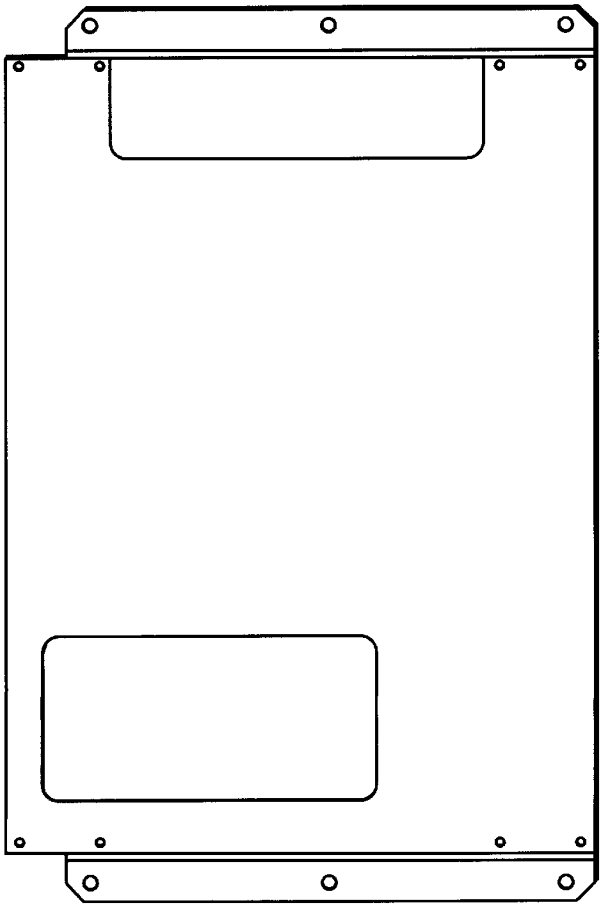
Figure 10C:
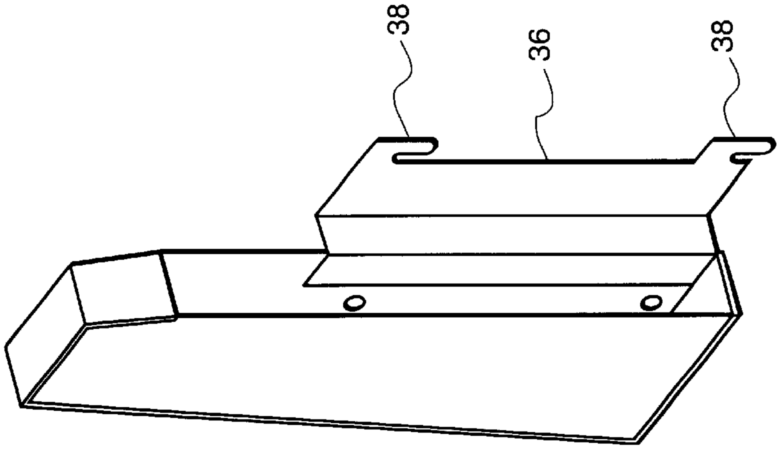
FIGS. 10A, 10B, and 10C show a rear elevation, a side elevation, and a perspective view of a monitor side bracket used with the upper panel as shown in FIGS. 1A and 1B.
Figure 10B:
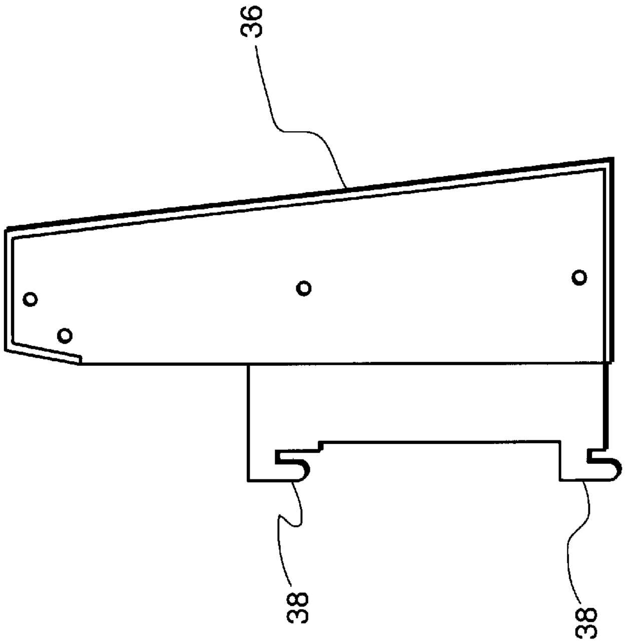
Figure 10A:
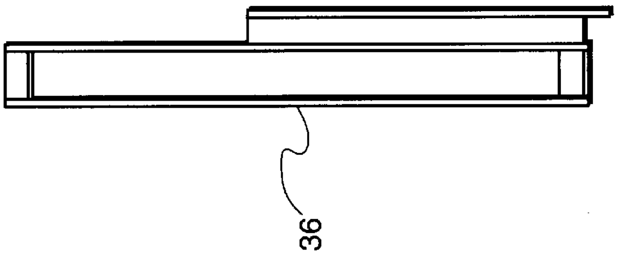

The upper panel 16 includes a front, substantially rectangular wrapper 32 provided with a rectangular aperture as best shown in FIG. 8*b*. The upper panel 16 also includes a generally rectangular bucket 34, as best shown in FIG. 9, which is adapted to overlap the wrapper 32. The upper panel 16 also includes a pair of side brackets 36 as best shown in FIGS. 10*a–c*. Each side bracket includes a pair of hook shaped members 38 adapted to protrude into and hang from a corresponding two of the slots in the backing panel 30. Lastly, the upper panel 16 includes a video screen 40, which may be a touch screen for a player to manually actuate game commands.

It will be appreciated from reviewing FIGS. 1*a*, 1*b*, 11, and 13 that the lower edge of the upper panel 16 extends slightly below the upper edge of the lower door 14 so that the lower door 14 helps secure the upper panel 16 against the backing plate 30.

The machine may also include a sensor 42, as shown in FIG. 11, for determining when the upper panel 16 is moved from its disposition against the backing plate 30. The sensor 42 is part of an alarm system that will generate an alarm signal if the sensor 42 senses that the upper panel 16 is being dislodged from the backing plate 30 and the lower door 14 is not open. Alternatively, the alarm signal will be generated when the sensor 42 senses that the upper panel 16 is dislodged from the backing plate 30 if the lower door has not been previously opened with any predetermined time interval. Thus, the sensor 42 and the associated alarm system provides a measure of security to prevent unauthorized access to the electrical and electromechanical devices contained within the housing 10, as well as to prevent access to the coins and bills also contained within the housing 10. The machine will also include conventional sensors to determine when the lower door 14 is opened.

Although not shown in the drawings, the present invention contemplates that a plurality of game control buttons that may be manually depressed may be disposed in various locations about the lower door 14 or the upper panel 16. As stated previously, the existing pull handle on the IGT S-Plus slot machine may also be utilized to initiate play of the game. It is further contemplated that these buttons and the pull arm may be used as an alternative to a manually activated touch screen control system, or alternatively, to supplement a manually activated touch screen control system.

Figure 14:
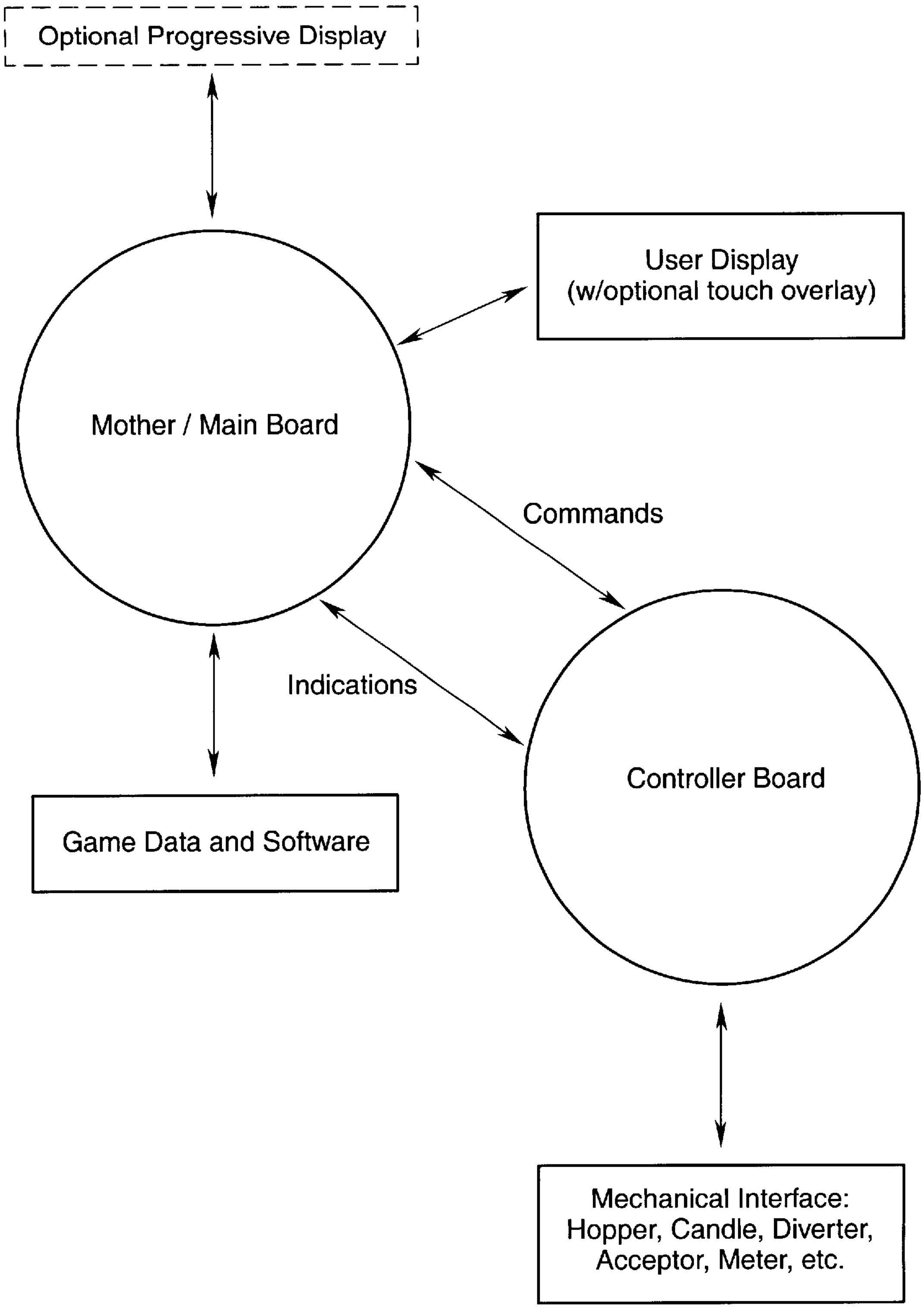
FIG. 14 is a schematic diagram illustrating how a mother board and controller board control the operations of the machine as shown in FIGS. 1A and 1B.
Figure 15:
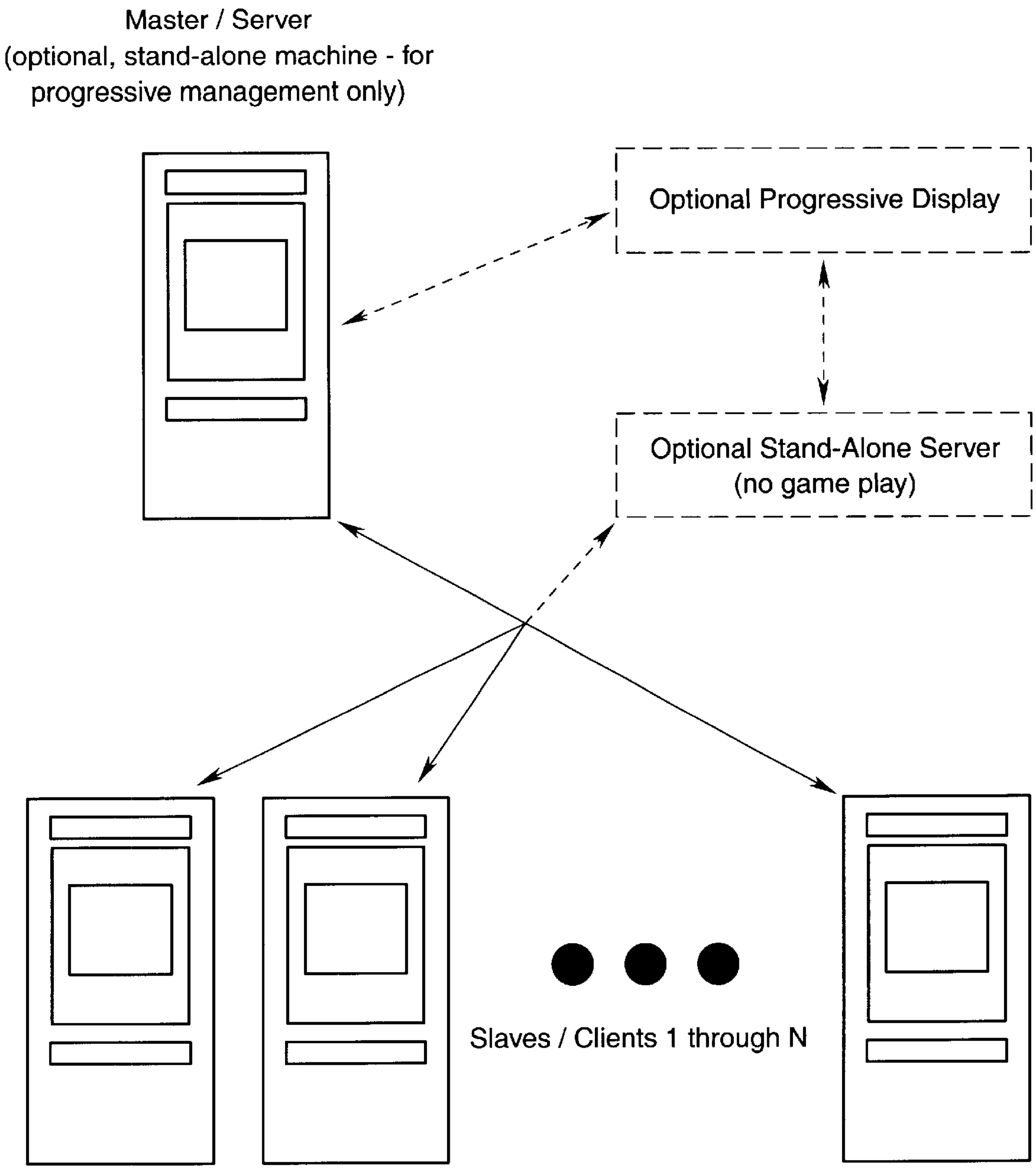
FIG. 15 is a schematic diagram illustrating how a plurality of the machines shown in FIGS. 1A and 1B can be operated with a stand-alone server.

Preferably, the processor of the present invention is segregated into a controller board and a main or mother board, as shown in FIG. 14. The controller board is responsible for interfacing to the electromechanical devices associated with the play of the game, while the mother/main board is responsible for implementing the actual game play. This dual board architecture permits different mother/main boards to be utilized to interface to the electromechanical game hardware. As such, different games may be played by simply replacing the mother/main board within the same mechanical chassis. The mother/main board may also regulate an optional progressive jackpot meter or display, incrementing the meter according to certain commands and decrementing the meter according to other commands when the jackpot is won.

It is possible to leverage the computing power of the mother/main board for indication processing by embodying protocol entirely within the mother/main board. In such an embodiment, the controller board will contain an electrical interface to connect directly to the mother/main board, such as through a parallel port interface. Such a connection will utilize a device driver on the mother/main board.

In a further aspect of the present invention, it is possible for a group of gaming machines to communicate information among their respective mother/main boards. In a master/slave relationship, one machine would provide game data, while the others would simply provide a mechanical interface. Such an arrangement will reduce cost by allowing for a reduced component count on each slave machine. The master machine would also control the play of each game. The master/slave relationship includes the further benefits of providing a central location for making upgrades, for gathering data, and for coordinating advertisements to be displayed on the machines.

In yet another version of the present invention, the server will act as a central repository for game data, however, the server is not capable of controlling game play.

In both of the foregoing architectures, it is possible to have a master or server control a progressive jackpot and to analyze all game play statistics. As a further variation, one machine may be enabled to gather and analyze statistics from multiple, autonomous gaming machines. The machine would then display the progressive jackpot output and inform the other machines of any jackpot payouts.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. A method of upgrading an IGT S-Plus slot wagering machine to a video touch screen wagering game machine comprising the steps of:

providing essentially an IGT S-Plus slot wagering machine;

removing the existing door, the processor board, the existing shelf including the reels, and the existing candle control board from said IGT S-Plus slot wagering machine;

installing a new processor board in said IGT S-Plus slot wagering machine;

operationally connecting said new processor board to at least two of the following devices: the existing lighting system, the existing change validator, the existing bill validator, and the existing hopper of said IGT S-Plus slot wagering machine;

mounting a lower door and an upper panel to said machine, said lower door disposal in the region where the existing door was disposed on said IGT S-Plus slot wagering machine and capable of being moved into an open position or a closed position, said upper panel including a video touch screen; and operationally connecting said new processor board to said video touch screen.

2. A method of upgrading an IGT S-Plus slot wagering machine to a video touch screen wagering game machine according to claim 1 wherein said lower door is substantially hingedly mounted on said IGT S-Plus slot wagering machine such that said lower door may rotatably swing about a substantially vertical axis substantially along one lateral side of said lower door.

3. A method of upgrading an IGT S-Plus slot wagering machine to a video touch screen wagering game machine according to claim 1 comprising the additional steps of providing a backing plate including at least two substantially vertically oriented spaced slots and mounting said plate substantially vertically in the upper region where said existing door was disposed, and wherein said upper panel includes at least two spaced hook members each adapted to extend into a corresponding one of said plate slots.

4. A method of upgrading an IGT S-Plus slot wagering machine to a video touch screen wagering game machine according to claim 2 comprising the additional steps of providing a backing plate including at least two substantially vertically oriented spaced slots and mounting said plate substantially vertically in the upper region where said existing door was disposed, and wherein said upper panel includes at least two spaced hook members each adapted to extend into a corresponding one of said plate slots.

5. A method of upgrading an IGT S-Plus slot wagering machine to a video touch screen wagering game machine according to claim 1 comprising the additional step of providing an alarm system adapted to initiate an alarm signal if said upper panel is moved and said lower door has not been previously opened within a predetermined time interval.

6. A method of upgrading an IGT S-Plus slot wagering machine to a video touch screen wagering game machine according to claim 1 comprising the additional step of providing an alarm system adapted to initiate an alarm signal if said upper panel is moved when said lower door is closed.

7. A video wagering game machine including:

a housing having a substantially hollow interior space adapted to receive a plurality of electrical and electromechanical components for operating said machine, said housing having an opening to offer access to said components;

a backing plate including at least two substantially vertically oriented spaced slots;

a lower door and an upper panel, each mounted over said opening, said upper panel being disposed substantially above said lower door, said lower door capable of being moved into an open position or a closed position, said upper panel including a video screen, said lower door substantially hingedly mounted on said machine such that said lower door may rotationally swing about a substantially vertical axis substantially about a lateral side of said lower door, said upper panel including at least two spaced hook members each adapted to extend into a corresponding one of said plate slots.

8. A video wagering game machine according to claim 7 additionally including an alarm system adapted to initiate an alarm signal if said upper panel is moved and said lower door has not been previously opened within a predetermined time interval.

9. A video wagering game machine according to claim 7 additionally including an alarm system adapted to initiate an alarm signal if said upper panel is moved when said lower door is closed.

* * * * *